(12) United States Patent
Sute

(10) Patent No.: US 10,104,499 B2
(45) Date of Patent: Oct. 16, 2018

(54) MOTOR VEHICLE KEY LOCATION SYSTEM USING WIRELESS SIGNAL

(71) Applicants: Denso International America, Inc., Southfield, MI (US); DENSO CORPORATION, Kariya, Aichi-pref. (JP)

(72) Inventor: Steven James Sute, Dearborn, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/440,895

(22) Filed: Feb. 23, 2017

(65) Prior Publication Data
US 2018/0242105 A1    Aug. 23, 2018

(51) Int. Cl.
  *H04W 4/02*  (2018.01)
  *H04W 4/00*  (2018.01)
  *H04L 29/08*  (2006.01)
  *H04W 4/80*  (2018.01)

(52) U.S. Cl.
  CPC ........... *H04W 4/023* (2013.01); *H04L 67/303* (2013.01); *H04W 4/008* (2013.01); *H04W 4/80* (2018.02)

(58) Field of Classification Search
  CPC .................................................. H04W 4/023
  See application file for complete search history.

(56) References Cited

U.S. PATENT DOCUMENTS

| | | |
|---|---|---|
| 6,759,983 B2 | 7/2004 | Eden |
| 7,038,589 B2 | 5/2006 | Schmidt et al. |
| 7,369,859 B2 | 5/2008 | Gallagher |
| 8,253,539 B2 | 8/2012 | Scaramozzino |
| 8,315,389 B2 | 11/2012 | Qiu et al. |
| 8,447,321 B2 | 5/2013 | Balachandran et al. |
| 8,687,560 B2 | 4/2014 | Sugar et al. |
| 8,723,729 B2 | 5/2014 | Desai et al. |
| 8,730,100 B2 | 5/2014 | Ische et al. |
| 8,754,812 B2 | 6/2014 | Moshfeghi |
| 8,799,361 B2 | 8/2014 | Ross et al. |
| 8,917,209 B2 | 12/2014 | Krasner et al. |
| 9,137,637 B2 | 9/2015 | Bilal et al. |

(Continued)

FOREIGN PATENT DOCUMENTS

| | | |
|---|---|---|
| EP | 1617601 A2 | 1/2006 |
| EP | 2673999 A1 | 12/2013 |

(Continued)

*Primary Examiner* — Christopher M Brandt
(74) *Attorney, Agent, or Firm* — Harness, Dickey & Pierce, P.L.C.

(57) ABSTRACT

Systems and methods are provided that include a transceiver system. The transceiver system is configured to (i) transmit a location request signal to a user identification device (UID), (ii) receive, in response to the UID receiving the location request signal, a position signal transmitted from the UID, and (iii) measure angles of arrival of the position signal for each transceiver of the transceiver system. A controller is in communication with the transceivers and is configured to (i) receive the angles of arrival, (ii) determine a location of the UID based on the angles of arrival, and (iii) activate at least one of an ignition system of a vehicle and a locking system of the vehicle based on the location of the UID.

15 Claims, 7 Drawing Sheets

(56) References Cited

U.S. PATENT DOCUMENTS

| | | |
|---|---|---|
| 9,160,074 B2 | 10/2015 | Desclos et al. |
| 9,232,357 B2 | 1/2016 | Buchheim et al. |
| 9,248,302 B2 | 2/2016 | Mashiach et al. |
| 2003/0198200 A1 | 10/2003 | Diener et al. |
| 2007/0109093 A1* | 5/2007 | Matsubara ......... G07C 9/00309 340/5.61 |
| 2009/0262673 A1 | 10/2009 | Hermersdorf |
| 2011/0148578 A1 | 6/2011 | Aloi et al. |
| 2011/0228753 A1 | 9/2011 | Polito et al. |
| 2012/0257508 A1 | 10/2012 | Reunamaki et al. |
| 2012/0289243 A1 | 11/2012 | Tarlow et al. |
| 2012/0316938 A1 | 12/2012 | Moshfeghi |
| 2012/0322367 A1 | 12/2012 | Kee |
| 2015/0023562 A1 | 1/2015 | Moshfeghi |
| 2015/0264506 A1 | 9/2015 | Balabanis et al. |
| 2015/0362581 A1 | 12/2015 | Friedman et al. |
| 2017/0018128 A1 | 1/2017 | Berezin et al. |
| 2017/0026910 A1* | 1/2017 | Scheim ............. H04W 52/0245 |

FOREIGN PATENT DOCUMENTS

| | | |
|---|---|---|
| SG | 157266 A1 | 12/2009 |
| WO | WO-05091013 A1 | 9/2005 |
| WO | WO-12136883 A1 | 10/2012 |
| WO | WO-14131074 A1 | 9/2014 |

* cited by examiner

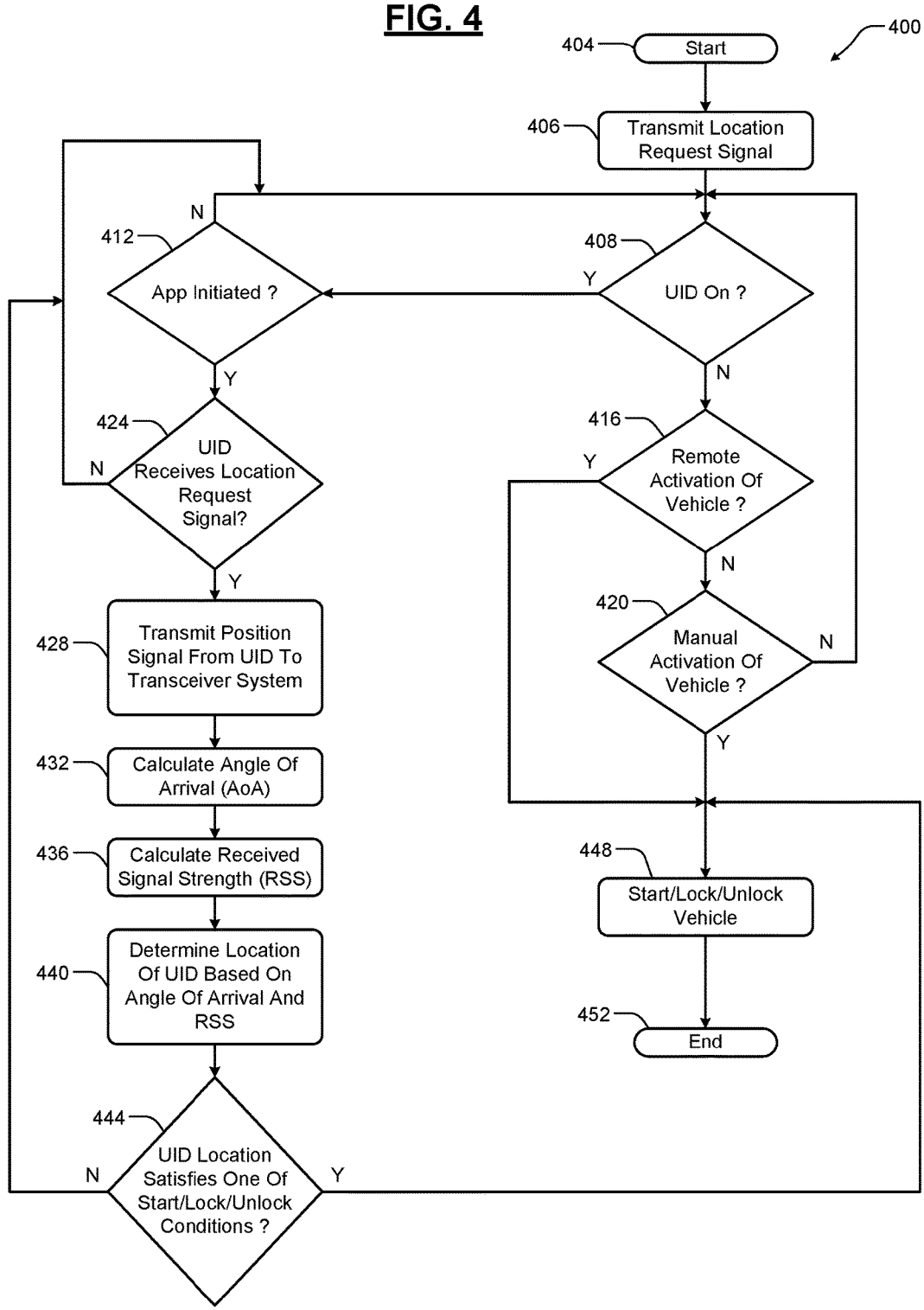

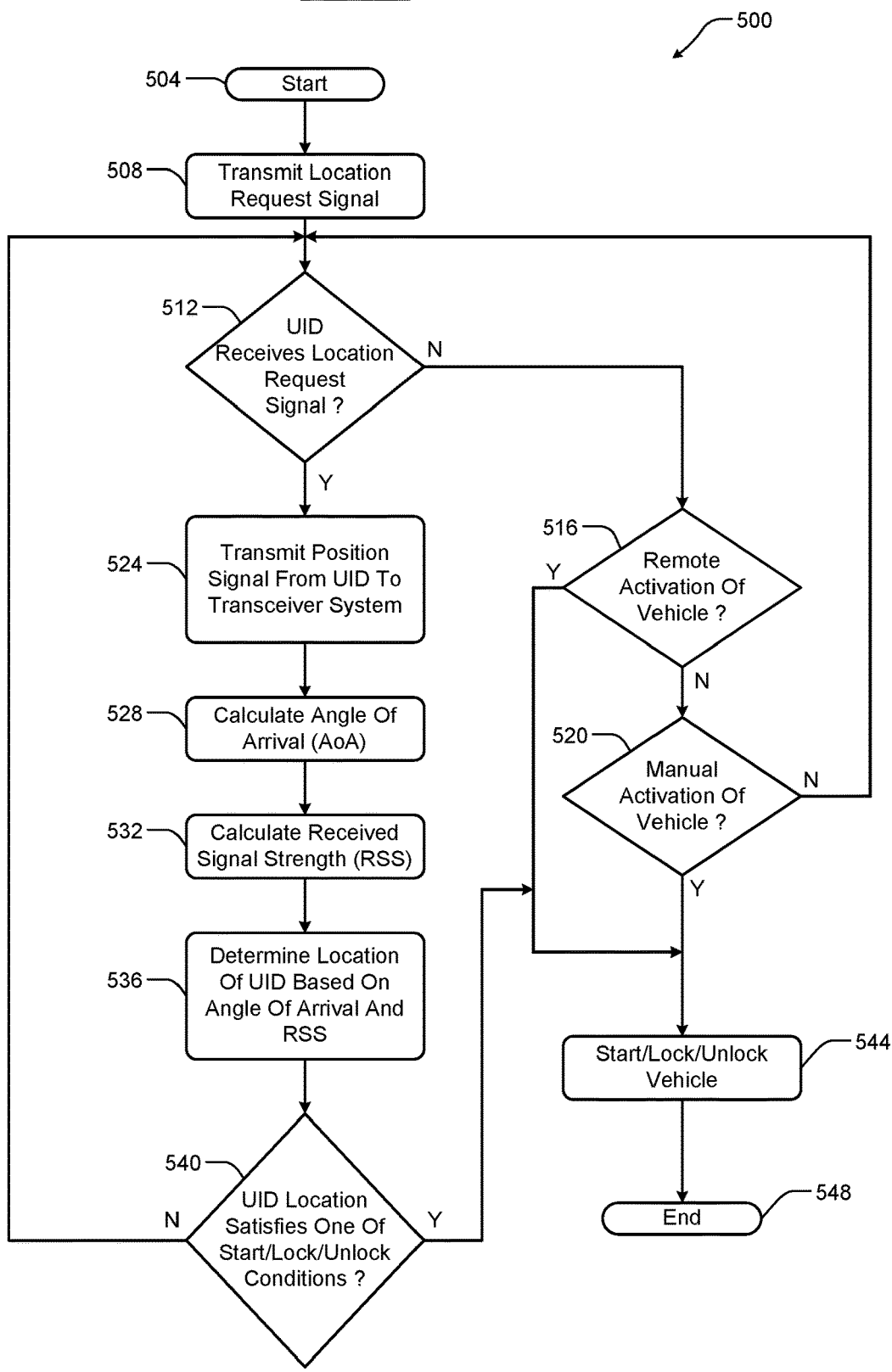

MOTOR VEHICLE KEY LOCATION SYSTEM USING WIRELESS SIGNAL

FIELD

The present disclosure relates to key location systems and, more specifically, to a system and method for key location using an angle of arrival and/or a received signal strength of a wireless signal.

BACKGROUND

This section provides background information related to the present disclosure and which is not necessarily prior art.

Many vehicles are equipped with key location systems. As an example, some key location systems incorporate low-frequency antennas to identify the location of a key fob. However, these key location systems consume large amounts of energy and, in some instances, are only compatible with key fobs proprietary to the vehicle manufacturer. As such, there is a need for an efficient key location system for a vehicle.

SUMMARY

This section provides a general summary of the disclosure, and is not a comprehensive disclosure of its full scope or all of its features.

A system is provided and includes a transceiver system that includes a plurality of transceivers. The transceiver system is configured to (i) transmit, using a first transceiver of the plurality of transceivers, a location request signal to a user identification device (UID), (ii) receive, using the plurality of transceivers and in response to the UID receiving the location request signal, a position signal transmitted from the UID, and (iii) measure, using the plurality of transceivers, a plurality of angles of arrival, wherein the plurality of angles of arrival is based on the position signal and each angle of arrival corresponds to one transceiver of the plurality of transceivers. The system further comprises a controller in communication with the plurality of transceivers, wherein the controller is configured to, using a processor executing instructions stored in a non-transitory memory, (i) receive the plurality of angles of arrival, (ii) determine a location of the UID based on the plurality of angles of arrival, and (iii) activate at least one of an ignition system of a vehicle and a locking system of the vehicle based on the location of the UID.

A method is also provided and includes transmitting, using a first transceiver of a plurality of transceivers, a location request signal to a user identification device (UID). The method also includes receiving, using the plurality of transceivers and in response to the UID receiving the location request signal, a position signal transmitted from the UID. The method also includes measuring, using the plurality of transceivers, a plurality of angles of arrival, wherein the plurality of angles of arrival is based on the position signal and each angle of arrival corresponds to one transceiver of the plurality of transceivers. The method also includes receiving, using a processor that is configured to execute instructions stored in a non-transitory memory, the plurality of angles of arrival from the plurality of transceivers. The method also includes determining, using the processor, a location of the UID based on the plurality of angles of arrival. The method also includes activating, using the processor, at least one of an ignition system of a vehicle and a locking system of the vehicle based on the location of the UID.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a flowchart for a control algorithm according to the present disclosure.

FIG. 5 is another flowchart for a control algorithm according to the present disclosure.

Corresponding reference numerals indicate corresponding parts throughout the several views of the drawings.

DETAILED DESCRIPTION

Example embodiments will now be described more fully with reference to the accompanying drawings.

Figure 1:
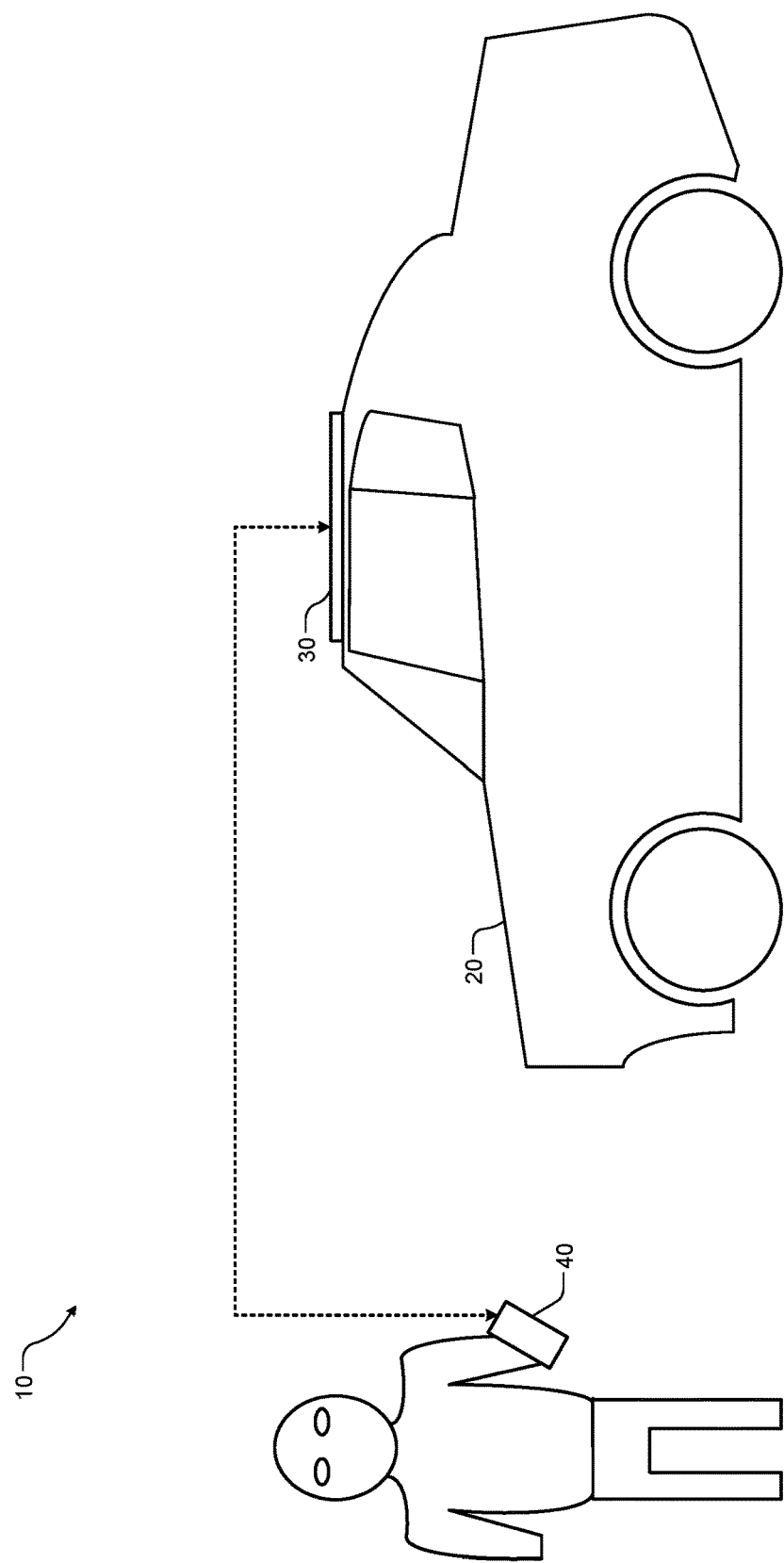
FIG. 1 illustrates an example key location system according to the present disclosure.

With reference to FIG. 1, an example key location system 10 is shown. In this embodiment, the key location system 10 may include a vehicle 20, a transceiver system 30, and a user identification device (UID) 40. As discussed in further detail below, the UID 40 may be a mobile device, a key fob, or other suitable computing device configured to transmit and receive telemetric signals. The transceiver system 30 may be coupled to the vehicle 20 in communication with the UID 40. As an example, the UID 40 and the transceiver system 30 may be configured to communicate using a telemetric link, such as an LTE or other cellular data signal, Wi-Fi, Bluetooth or Bluetooth Low Energy signal, or dedicated short range communication (DSRC) signal. The key location system 10 is configured to, using the transceiver system 30, determine a position of the UID 40 based on a position signal that is transmitted by the UID 40. Based on the position of the UID 40, the key location system 10 may be configured to lock, unlock, or start the vehicle 20, as described below in further detail.

Figure 2A:
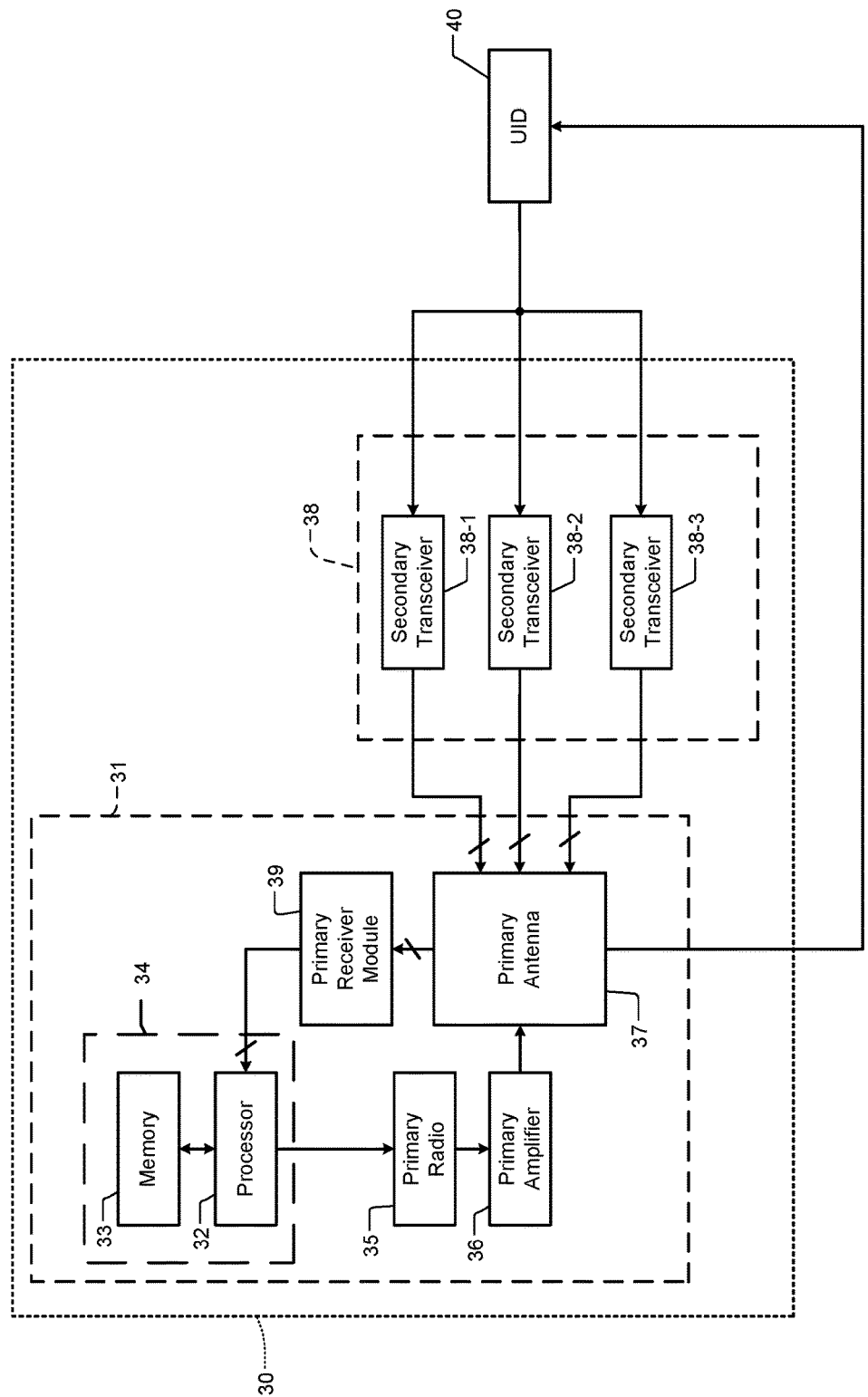
FIG. 2A is a functional block diagram of a transceiver system of the key location system according to the present disclosure.

With reference to FIG. 2A, an example embodiment of the transceiver system 30 and the UID 40 is shown. In the example embodiment, the transceiver system 30 includes a primary transceiver system 31 and a secondary transceiver system 38. In response to being activated by a processor 32 of a controller 34, a primary radio 35 transmits a location request signal through the primary antenna 37. The primary amplifier 36, which may be a bidirectional amplifier, may electrically couple the primary radio 35 and the primary antenna 37 via an RF cable. The primary amplifier 36 may increase the range of the location request signal generated by the primary radio 35 and increase the lower boundary of signal strength detectable by the primary antenna 37.

In response to the UID 40 receiving the location request signal from the primary antenna 37, the UID 40 is configured to transmit a position signal to the secondary transceiver system 38. As an example, the UID 40 may be a mobile device, a key fob, or other suitable computing device that is configured to transmit and receive telemetric signals. The UID 40 may transmit the position signal such that it radiates from the UID 40 in a circular pattern.

Each secondary transceiver 38-1, 38-2, 38-3 of the secondary transceiver system 38 may include a radio, an amplifier, and a receiver module, as described below in further detail. While this embodiment illustrates three secondary transceivers 38-1, 38-2, 38-3, any number of secondary transceivers may be incorporated into the secondary transceiver system 38. In response to each of the secondary transceivers 38-1, 38-2, 38-3 receiving the position signal from the UID 40, each secondary transceiver 38-1, 38-2, 38-3 transmits a plurality of reference signals based on the position signal to the processor 32 via the primary antenna 37 and the primary receiver module 39.

Based on the plurality of reference signals, as described below in further detail, the processor 32 is configured to, using instructions stored in a memory 33 of the primary transceiver system 31, determine an angle of arrival (AoA) and/or a received signal strength (RSS) of the position signal measured at each secondary transceiver 38-1, 38-2, 38-3. Based on each of the AoA and/or RSS of the position signal at each secondary transceiver 38-1, 38-2, 38-3, the processor 32 is configured to determine the location of the UID 40 relative to the vehicle 20. The memory 33 may be a non-transitory computer readable medium, such as a read-only memory (ROM) and/or random-access memory (RAM) component.

The primary receiver module 39 may include an RF filter and an RF amplifier to suppress image frequencies and to prevent saturation of the primary transceiver system 31. A local oscillator of the primary receiver module 39 may be configured to provide a mixing frequency to a frequency mixer in order to change the received frequency into a new, intermediate frequency. An intermediate frequency filter and amplifier may be configured to amplify the signal and limit the intermediate frequencies to a certain bandwidth. Subsequently, a demodulator may extract the desired modulation from the filtered intermediate frequency and deliver the extracted modulation to the processor 32, which includes the reference signals transmitted from each of the secondary transceivers 38-1, 38-2, 38-3.

Figure 2B:
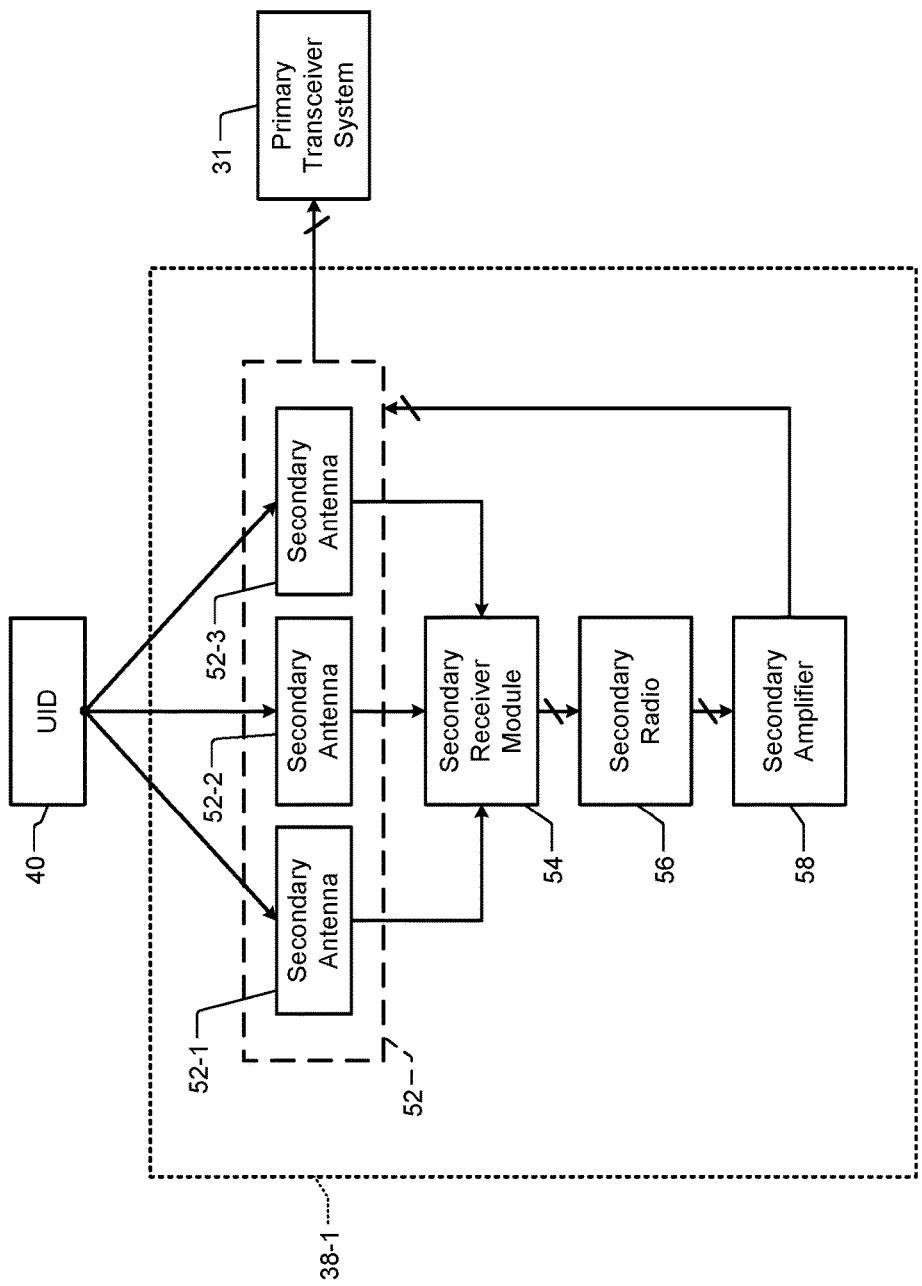
FIG. 2B is a functional block diagram of a secondary transceiver of the transceiver system according to the present disclosure.

With reference to FIG. 2B, an example embodiment of the secondary transceiver 38-1 generating a plurality of reference signals is shown. In this example embodiment, the secondary transceiver 38-1 includes a secondary antenna array 52, a secondary receiver module 54, a secondary radio 56, and a secondary amplifier 58.

As an example, to measure the AoA of the position signal at the secondary transceiver 38-1, each secondary antenna 52-1, 52-2, 52-3 of the secondary antenna array is configured to receive the position signal, which is transmitted from the UID 40 and has a circular pattern, as described above. Moreover, each secondary antenna 52-1, 52-2, 52-3 measures a phase angle of the position signal. The secondary transceiver 38-1 may then, using the secondary receiver module 54, extract a desired modulation from each of the measured position signals and deliver the extracted modulation to the processor 32, which includes the phase angles measured at each of the secondary antennas 52-1, 52-2, 52-3. The secondary receiver module 54, which is similar to the primary receiver module 39, may include an RF filter and an RF amplifier to suppress image frequencies and to prevent saturation of the secondary transceiver 38-1. A local oscillator of the secondary receiver module 54 may be configured to provide a mixing frequency to a frequency mixer in order to change the received frequency into a new, intermediate frequency. An intermediate frequency filter and amplifier may be configured to amplify the signal and limit the intermediate frequencies to a certain bandwidth. Subsequently, a demodulator may extract the desired modulation from the filtered intermediate frequency and deliver the extracted modulation to the primary transceiver system 31.

Based on the measured phase angles of the position signal measured at each of the secondary antennas 52-1, 52-2, 52-3 and received by the secondary receiver module 54, the secondary radio 56 may be configured to generate and transmit at least one reference signal to the primary transceiver system 31 via the secondary amplifier 58 and at least one of the secondary antennas 52-1, 52-2, 52-3 of the secondary antenna array 52. The secondary radio 56 may be configured to generate a corresponding reference signal for each measured phase angle of each secondary antenna 52-1, 52-2, 52-3. Alternatively, the secondary radio 56 may be configured to generate a single reference signal that represents each of the measured phase angles of the secondary antennas 52-1, 52-2, 52-3. The secondary amplifier 58, which may be a bidirectional amplifier, may electrically couple the secondary radio 56 and the secondary antenna array 52 via an RF cable. The secondary amplifier 58 may increase the range of the reference signals generated by the secondary radio 5 and increase the lower boundary of signal strength detectable by the primary transceiver system 31.

Alternatively, the measured phase angles of the position signal measured at each of the secondary antennas 52-1, 52-2, 52-3 and received by the secondary receiver module 54 may be provided directly to the processor 32 of the primary transceiver system 31 via a hardwire link, such as an RF cable (not shown).

The processor 32 of the primary transceiver system 31 may then be configured to, based on the reference signals, determine the phase angle of the position signal measured at each of the secondary antennas 52-1, 52-2, 52-3. Based on a difference of the measured phase angle of the position signal at each of the secondary antennas 52-1, 52-2, 52-3 (e.g., the phase angle measured at secondary antenna 52-1 is $\varphi_1$, the phase angle measured at secondary antenna 52-2 is $\varphi_2$, and the phase angle measured at secondary antenna 52-3 is $\varphi_3$) the processor 32 may be able, based on to determine the AoA of the position signal. While one example implementation of determining the AoA of the position signal is described above, other methods of determining the AoA of the position signal may be implemented.

To measure the RSS of the position signal, each secondary antenna array 52-1, 52-2, 52-3 of the antenna array 52 may be configured to measure at least one of a power ratio in decibels of the reference signals (dBm), a power spectral density of the reference signals (dBm/MHz), and/or a bit error rate (BER) of the reference signals. Subsequently, using the secondary receiver module 54, the secondary radio 56, the secondary amplifier 58, and the antenna array 52, as similarly described above, a signal corresponding to at least one of the dBm, dBm/MHz, and BER of the position signal may be provided to the processor 32 of the of the primary transceiver system 31. The processor 32 may then be configured to, based on instructions stored in the memory 33 of the primary transceiver system 31, determine the RSS of the position signal. Using the RSS of the message may allow the controller 34 to determine the relative proximity of the UID 40 in relation to the vehicle 20. Generally, a higher RSS may indicate that the UID 40 is closer to the vehicle 20, while a lower RSS may indicate that the UID 40 is further away from the vehicle 20.

Accordingly, the processor 32 is configured to determine, based on each of the AoA and/or RSS of the position signal at each secondary transceiver 38-1, 38-2, 38-3, the location of the UID 40 relative to the vehicle 20. As an example, the processor 32 may be configured to just use the AoA of the position signal to determine the location of the UID 40 relative to the vehicle 20. Alternatively, the processor 32 may be configured to use the AoA and the RSS of the position signal in order to improve the accuracy of the location determination of the UID 40 relative to the vehicle 20.

Figure 3A:
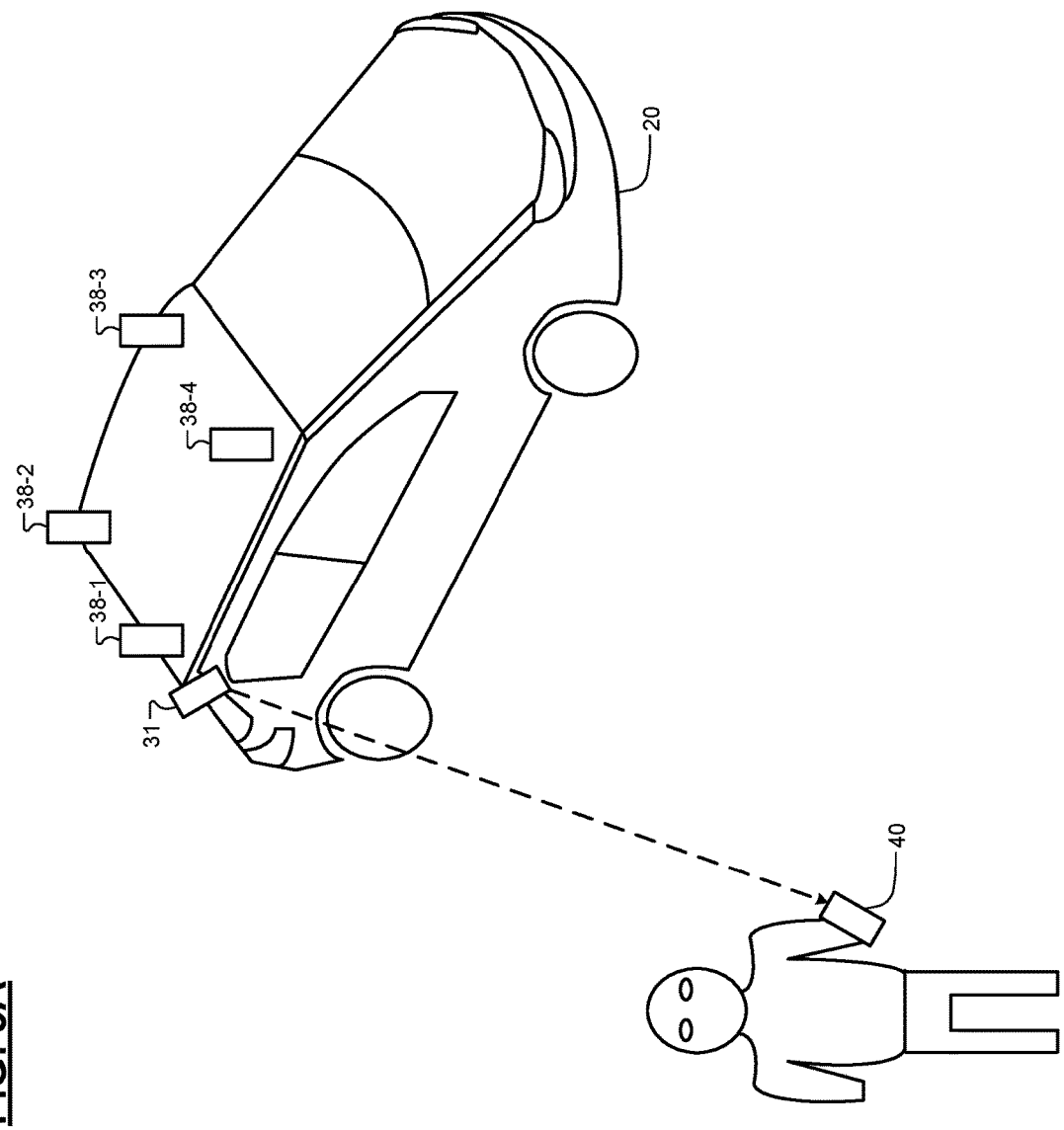
FIGS. 3A-3B are functional block diagrams of an example key location system according to the present disclosure.

With reference to FIG. 3A, an example embodiment of the transceiver system 30 of the key location system 10 transmitting the location request signal is shown. The primary transceiver system 31 may be located at a first location on an exterior of the vehicle 20, and the secondary transceivers 38-1, 38-2, 38-3, 38-4 of the secondary transceiver system 38 may be located at multiple locations on a roof of the vehicle 20. Alternatively, some or all of the components of the primary transceiver system 31 and the secondary transceiver system 38 may be located in an interior of the vehicle 20. As described above, the primary transceiver system 31 is configured to transmit the location request signal, which is shown by the dashed line in FIG. 3A. The primary transceiver system 31 may be configured to continuously or periodically (e.g., every 60 seconds) transmit the location request signal. Once the UID 40 transmits the position signal in response to receiving the location request signal, the primary transceiver system 31 may be further configured to, using the processor 32, stop transmitting the location request signal. Additionally or alternatively, the primary transceiver system 31 may be further configured to stop transmitting the location request signal in response to the key location system 10 locking, unlocking, starting, or operating the vehicle 20.

Figure 3B:
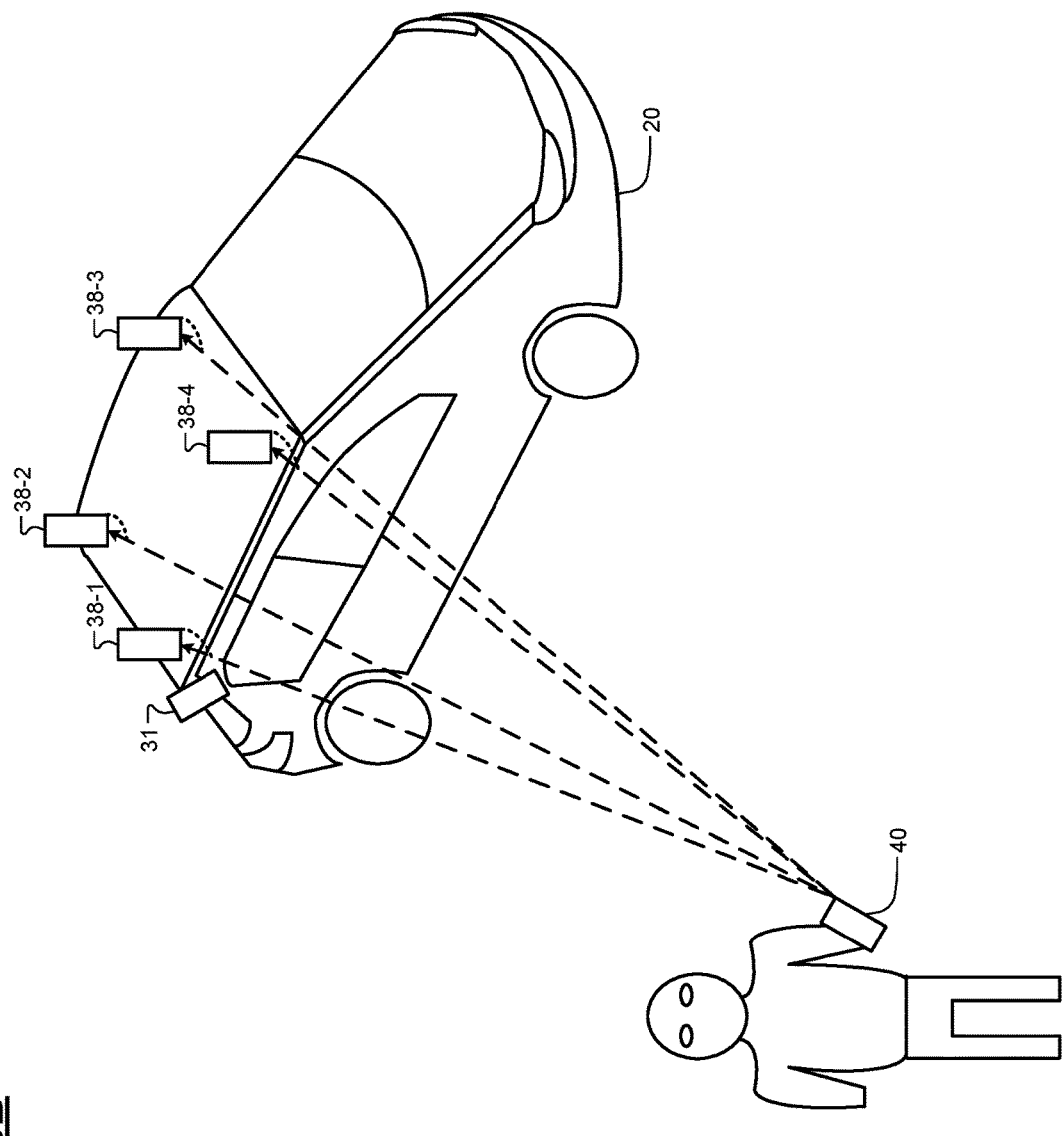

With reference to FIG. 3B, an example embodiment of the transceiver system 30 of the key location system 10 transmitting the position signal is shown. As described above, the UID 40 transmits the position signal in response to receiving the location request signal. Based on the position signal, each secondary transceiver 38-1, 38-2, 38-3, 38-4 generates a reference signal corresponding to at least one of the AoA and the RSS of the position signal measured at each secondary transceiver 38-1, 38-2, 38-3, 38-4. The UID 40 may be further configured to stop transmitting the position signal in response to the key location system 10 locking, unlocking, starting, or operating the vehicle 20.

With reference to FIG. 4, a control algorithm 400 for the key location system 10 when the UID 40 is a mobile device is illustrated. The control algorithm 400 may be performed, for example, by the transceiver system 30. The control algorithm 400 starts at 404. At 406, the control algorithm 400, using the primary transceiver system 31 of the transceiver system 30, begins transmitting the location request signal. The location request signal may be continuously or periodically transmitted, as described above.

At 408, the control algorithm 400 determines whether the UID 40 is on. If so, the control algorithm 400 proceeds to 412; otherwise, the control algorithm 400 proceeds to 416. At 416, in response to the UID 40 being off, the control algorithm 400 determines whether an operator has remotely activated the vehicle 20. Specifically, the control algorithm 400 determines whether the operator, using a button on a key fob or mobile device, has commanded the vehicle 20 to start, lock, or unlock the vehicle 20. If so, the control algorithm 400 proceeds to 448; otherwise, the control algorithm proceeds to 420. At 420, the control algorithm 400 determines whether an operator has manually activated the vehicle 20. Specifically, the control algorithm 400 determines whether the operator has manually inserted a key into one of the ignition system and locking system of the vehicle 20. If so, the control algorithm 400 proceeds to 448; otherwise, the control algorithm 400 returns to 408.

Returning to 412, the control algorithm 400 determines, using a processor of the UID 40, whether a software application (app) of the UID 40 has been initiated. As an example, the UID 40 may include an app that is configured to enable the UID 40 to detect the location request signal, command the UID 40 to transmit the position signal in response to receiving the location request signal, and set a locking, unlocking, and starting condition (collectively referred to as activation conditions) of the vehicle 20, as described below in further detail. Furthermore, the app may be configured to operate in a background app state, thereby allowing the UID 40 to use a relatively small amount of the UID processor and battery to operate the app. Additionally or alternatively, the app may be configured to operate in a foreground app state in order to, for example, set the activation conditions of the vehicle 20. If the app has been initiated, the control algorithm 400 proceeds to 424; otherwise, the control algorithm 400 returns to 408.

At 424, the control algorithm 400 determines whether the UID 40 has received the location request signal. In other words, the control algorithm 400 determines whether the UID 40 is within the range of the transceiver system 30. If so, the control algorithm 400 proceeds to 428; otherwise, the control algorithm 400 returns to 408. At 428, the control algorithm 400, using the UID 40 and in response to receiving the location request signal, begins to transmit the position signal. The control algorithm 400, using the transceiver system 30, then calculates the AoA and the RSS of the position signal at 432 and 436, respectively. At 440, the control algorithm 400, using the processor 32 of the primary transceiver system 31, determines the location of the UID 40 based on the AoA and RSS of the position signal.

At 444, the control algorithm 400, using the processor 32 of the primary transceiver system 31, determines whether the location of the UID 40 satisfies one of a start condition, lock condition, or unlock condition. The lock and unlock conditions are predetermined distances, ranges, and/or directions that cause the vehicle 20 to lock or unlock the vehicle 20, respectively. The lock and unlock conditions may be chosen by an app developer or the operator of the UID 40 using the app. As an example, in order to satisfy the unlock condition, the UID 40 may be within 10 feet of the vehicle 20. Additionally, the unlock condition may require the UID 40 to approach the vehicle 20, and therefore, an additional measurement to verify that the UID 40 is approaching the vehicle 20 may be taken (e.g., once the processor 32 determines that the UID 40 is 10 feet from the vehicle 20, the processor 32 may unlock the vehicle 20 once it subsequently determines that the UID 40 is 9 feet away from the vehicle 20). As another example, in order to satisfy the lock condition, the UID 40 may be at least 15 feet from the vehicle 20. Additionally, the lock condition may require the UID 40 to be moving away from the vehicle 20, and therefore, an additional measurement to verify that the UID 40 is moving away from the vehicle 20 may be taken (e.g., once the processor 32 determines that the UID 40 is 15 feet from the vehicle 20, the processor 32 may lock the vehicle 20 once it subsequently determines that the UID 40 is 17 feet away from the vehicle 20). Additionally or alternatively, the lock condition may be satisfied when it is determined that the UID is located inside the vehicle and the ignition system of the vehicle 20 has been activated.

The start condition is a set of predetermined distances, ranges, directions, and/or other variables that cause the vehicle 20 to start. As an example, in order to satisfy the start condition, the UID 40 may be within 45 feet of the vehicle 20. Additionally, the start condition may require the UID 40 to approach the vehicle 20, and therefore, an additional measurement to verify that the UID 40 is approaching the vehicle 20 may be taken (e.g., once the processor 32 determines that the UID 40 is 45 feet from the vehicle 20, the processor 32 may unlock the vehicle 20 once it subsequently determines that the UID 40 is 35 feet away from the vehicle 20). Furthermore, other variables, such as a temperature, may adjust the start condition. If the temperature is below a certain minimum threshold, the start condition may be updated to increase distance threshold (e.g., if the temperature is below 32'F, the threshold distance may be adjusted from 45 feet to 100 feet, thereby allowing the operator to defrost a window of the vehicle 20 and warm up both the interior and engine of the vehicle 20). If the temperature is above a certain maximum threshold, the start condition may be updated to increase distance threshold (e.g., if the temperature is above 80'F, the threshold distance may be adjusted from 45 feet to 100 feet, thereby allowing the operator to cool down the interior of the vehicle 20).

In response to the control algorithm determining that the UID location satisfies one of the start condition, lock condition, or unlock condition, the control algorithm transfers to 448; otherwise, the control algorithm returns to 408. At 448, the control algorithm 400, based on which condition is satisfied, may start, lock, or unlock the vehicle 20. The control algorithm 400 then ends at 452.

With reference to FIG. 5, a control algorithm 500 for the key location system 10 when the UID 40 is a key fob is illustrated. The control algorithm 500 may be performed, for example, by the transceiver system 30. The control algorithm 500 starts at 504. At 508, the control algorithm 500, using the primary transceiver system 31 of the transceiver system 30, begins transmitting the location request signal. The location request signal may be continuously or periodically transmitted, as described above.

At 512, the control algorithm 500 determines whether the UID 40 has received the location request signal. In other words, the control algorithm 500 determines whether the UID 40 is within the range of the transceiver system 30. If so, the control algorithm 500 proceeds to 524; otherwise, the control algorithm 500 proceeds to 516. At 516, in response to the UID 40 not receiving the location request signal, the control algorithm 500 determines whether an operator has remotely activated the vehicle 20. Specifically, the control algorithm 500 determines whether the operator, using a button on a key fob or mobile device, has commanded the vehicle 20 to start, lock, or unlock the vehicle 20. If so, the control algorithm 500 proceeds to 544; otherwise, the control algorithm proceeds to 520. At 520, the control algorithm 500 determines whether an operator has manually activated the vehicle 20. Specifically, the control algorithm 500 determines whether the operator has manually inserted a key into either the ignition system or locking system of the vehicle 20. If so, the control algorithm 500 proceeds to 544; otherwise, the control algorithm 500 returns to 512.

At 524, the control algorithm 500, using the UID 40 and in response to receiving the location request signal, begins to transmit the position signal. The control algorithm 500, using the transceiver system 30, then calculates the AoA and the RSS of the position signal at 528 and 532, respectively. At 536, the control algorithm 500, using the processor 32 of the primary transceiver system 31, determines the location of the UID 40 based on the AoA and RSS of the position signal.

At 540, the control algorithm 500 determines whether the UID location satisfies at least one of the start condition, lock condition, and unlock condition, as described above with reference to FIG. 4. If so, the control algorithm 500 transfers to 544; otherwise, the control algorithm 500 returns to 512. At 544, the control algorithm 500, based on which condition is satisfied, may start, lock, or unlock the vehicle 20. The control algorithm 500 then ends at 548.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
a transceiver system that includes a plurality of transceivers, wherein the transceiver system is configured to (i) transmit, using a first transceiver of the plurality of transceivers, a location request signal to a user identification device (UID), (ii) receive, using the plurality of transceivers and in response to the UID receiving the location request signal, a position signal transmitted from the UID, and (iii) measure, using the plurality of transceivers, a plurality of angles of arrival, wherein the plurality of angles of arrival is based on the position signal and each angle of arrival corresponds to one transceiver of the plurality of transceivers; and
a controller in communication with the plurality of transceivers, wherein the controller is configured to, using a processor executing instructions stored in a non-transitory memory, (i) receive the plurality of angles of arrival, (ii) determine a location of the UID based on the plurality of angles of arrival, (iii) determine a distance between the UID and a vehicle based on the location of the UID, (iv) compare the distance with a distance threshold, and (v) activate at least one of an ignition system of the vehicle and a locking system of the vehicle based on the comparison; and
wherein the controller is further configured to determine an outdoor temperature, compare the outdoor temperature with at least one of a minimum temperature threshold and a maximum temperature threshold, and increase the distance threshold when at least one of the outdoor temperature is below the minimum temperature threshold and the outdoor temperature is above the maximum temperature threshold.

2. The system of claim 1, wherein the transceiver system is configured to, using the plurality of transceivers, measure a plurality of received signal strengths (RSS), wherein the plurality of RSS is based on the position signal and each RSS corresponds to one transceiver of the plurality of transceivers.

3. The system of claim 2, wherein the controller is configured to, using the processor executing instructions stored in the non-transitory memory, (i) receive the plurality of RSS, and (ii) determine the location of the UID additionally based on the plurality of RSS.

4. The system of claim 1, wherein the transceiver system includes a primary transceiver system and a secondary transceiver system.

5. The system of claim 4, wherein the primary transceiver system is configured to transmit the location request signal to the UID.

6. The system of claim 4, wherein the primary transceiver system includes the controller.

7. The system of claim 4, wherein the secondary transceiver system is configured to receive the position signal and measure the plurality of angles of arrival.

8. The system of claim 1, wherein the UID transmits the position signal using at least one of a Bluetooth signal, cellular data signal, and Wi-Fi signal.

9. The system of claim 1, wherein the controller activates the locking system of the vehicle in response to at least one of the location, a range, and a direction satisfying one of a lock condition and an unlock condition.

10. The system of claim 1, wherein the controller activates the ignition system of the vehicle in response to at least one of the location, a range, a direction, and a temperature satisfying a start condition.

11. A method comprising:
transmitting, using a first transceiver of a plurality of transceivers, a location request signal to a user identification device (UID);
receiving, using the plurality of transceivers and in response to the UID receiving the location request signal, a position signal transmitted from the UID;
measuring, using the plurality of transceivers, a plurality of angles of arrival, wherein the plurality of angles of arrival is based on the position signal and each angle of arrival corresponds to one transceiver of the plurality of transceivers;
receiving, using a processor that is configured to execute instructions stored in a non-transitory memory, the plurality of angles of arrival from the plurality of transceivers;
determining, using the processor, a location of the UID based on the plurality of angles of arrival;
determining, using the processor, a distance between the UID and a vehicle based on the location of the UID;
comparing, using the processor, the distance with a distance threshold;
activating, using the processor, at least one of an ignition system of the vehicle and a locking system of the vehicle based on the comparison;
determining, using the processor, an outdoor temperature;
comparing, using the processor, the outdoor temperature with at least one of a minimum temperature threshold and a maximum temperature threshold; and
increasing, using the processor, the distance threshold when at least one of the outdoor temperature is below the minimum temperature threshold and the outdoor temperature is above the maximum temperature threshold.

12. The method of claim 11 further including measuring, using the plurality of transceivers, a plurality of received signal strengths (RSS), wherein the plurality of RSS is based on the position signal and each RSS corresponds to one transceiver of the plurality of transceivers.

13. The method of claim 12 further comprising:
receiving, using the processor, the plurality of RSS; and
determining, using the processor, the location of the UID additionally based on the plurality of RSS.

14. The method of claim 11, wherein the processor activates the locking system of the vehicle in response to at least one of the location, a range, and a direction satisfying one of a lock condition and an unlock condition.

15. The method of claim 11, wherein the processor activates the ignition system of the vehicle in response to at least one of the location, a range, a direction, and a temperature satisfying a start condition.

* * * * *